Figure 4:
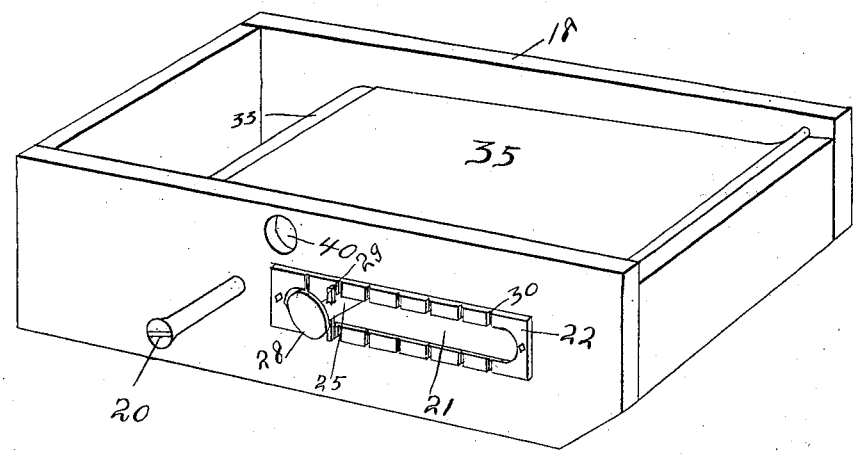

No. 735,852. PATENTED AUG. 11, 1903.
E. J. AUSTIN.
COMPUTING MEASURING CABINET.
APPLICATION FILED AUG. 28, 1902.
NO MODEL. 2 SHEETS—SHEET 1.
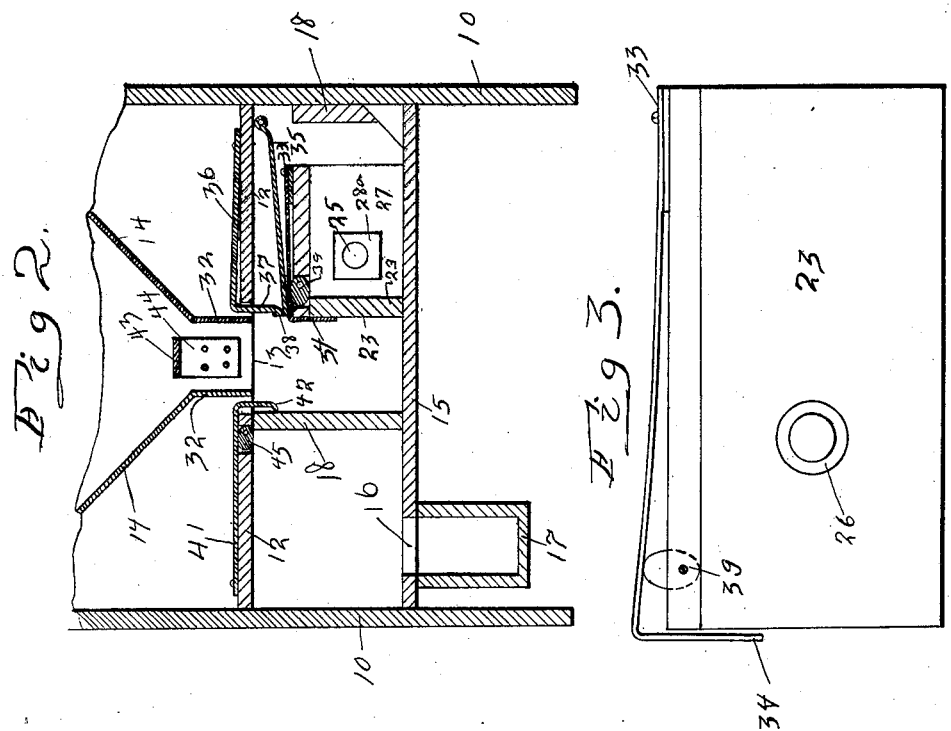
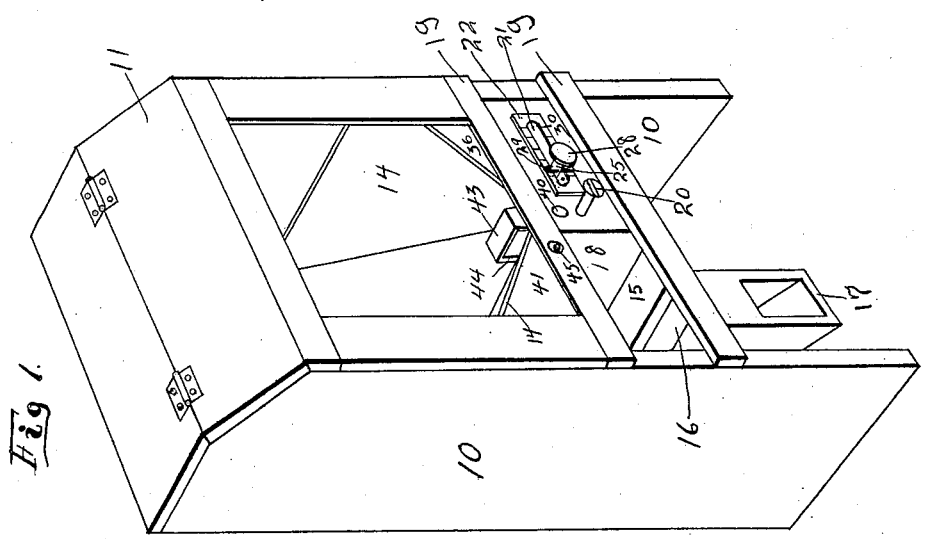
Witnesses
L. L. Leibrock.
Henry Manger.
Inventor Ernest J. Austin
by Quirig & Lane
Attys.

No. 735,852. PATENTED AUG. 11, 1903.
E. J. AUSTIN.
COMPUTING MEASURING CABINET.
APPLICATION FILED AUG. 28, 1902.
NO MODEL. 2 SHEETS—SHEET 2.

Witnesses
L. L. Leibrock
Henry Manger

Inventor Ernest J. Austin
by Quirig & Lane
Attys.

No. 735,852. Patented August 11, 1903.

UNITED STATES PATENT OFFICE.

ERNEST J. AUSTIN, OF NEWTON, IOWA, ASSIGNOR TO FRED L. MAYTAG, OF NEWTON, IOWA.

COMPUTING MEASURING-CABINET.

SPECIFICATION forming part of Letters Patent No. 735,852, dated August 11, 1903.

Application filed August 28, 1902. Serial No. 121,408. (No model.)

*To all whom it may concern:*

Be it known that I, ERNEST J. AUSTIN, a citizen of the United States, residing at Newton, in the county of Jasper and State of Iowa, have invented certain new and useful Improvements in Computing Measuring-Cabinets, of which the following is a specification.

This invention is a measuring-cabinet designed to contain a quantity of coffee or other substance which is sold in the ordinary grocery store, and is operated to discharge certain portions of predetermined measure from the cabinet.

My object is to provide an attachment to a machine of the class described which will prevent the machine from being clogged up by substance contained in it on account of such substance getting into the working parts of the machine, and, further, to provide an attachment which can be easily and readily applied to machines of the class referred to in use at the present time by simply removing a small portion of said machine and attaching my device to it.

A further and primary object is to provide adjustable plates in a machine of the class described which can be readily adjusted to vary the size of the measuring portion of the cabinet as to enable the operator to use substances of different weights by simply adjusting eccentrics or other means whereby the inner ends of the plates are raised and lowered.

A further object is to provide an accurate measuring-box the partition in which can be readily and easily moved from one portion of it to another and held firmly in position by means of a portion of my device.

A further object is to provide an attachment for a machine of the class referred to which is so constructed that it can be readily attached beneath the inclined bottom of a computing measuring-cabinet and which will be a slight distance below said inclined bottom, so that when the substance contained above the inclined bottom is escaping it will be directed as desired by the operator and prevented from escaping any other way.

A further object is to provide an attachment which will even the coffee off in the measuring-chamber at any desirable level in said chamber.

A further object is to provide means for preventing a substance contained in the cabinet from flowing too rapidly into the measuring-chamber. This means assists materially in supporting the substance in the cabinet.

A further object is to provide a computing measuring-cabinet in which the measuring portion can be adjusted to substances of different weight and size without changing the computing-plate on the front of the measuring-chamber.

My invention consists in certain details in the construction, arrangement, and combination of the various parts of the device whereby the objects contemplated are attained, as hereinafter more fully set forth, pointed out in my claims, and illustrated in the accompanying drawings, in which—

Figure 5:
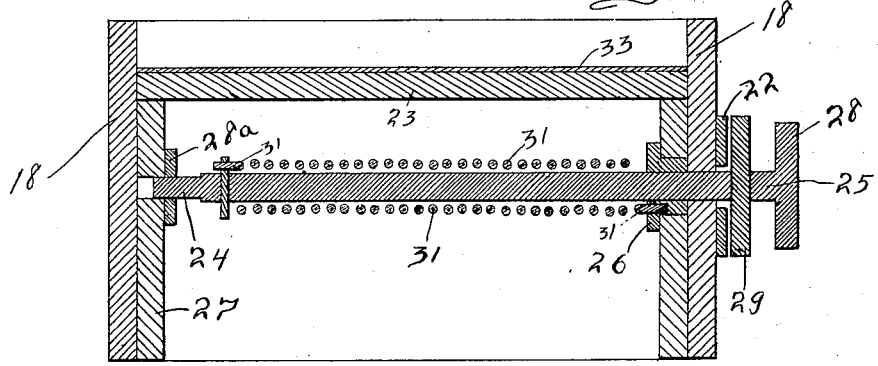
Figure 6:
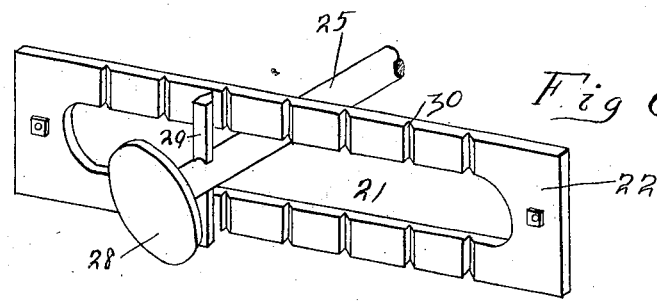

Figure 1 shows the complete measuring-cabinet in perspective. Fig. 2 shows a vertical longitudinal sectional view of the lower portion of my cabinet with the upper portion thereof broken away. Fig. 3 is a front elevation of the partition in the measuring-chamber. Fig. 4 is a perspective view of the complete measuring-chamber. Fig. 5 is a cross-sectional view of the measuring-chamber and the partition in said chamber cut through the rod for operating the partition, and Fig. 6 is a detail perspective view of a portion of the rod and handle by which the partition in the measuring-chamber is operated and also shows the plate which is attached to the front side of the measuring-chamber.

Referring to the accompanying drawings, I have used the reference-numeral 10 to indicate the machine-frame. At the top of the machine-frame is a hinged cover 11. Near the central portion of the machine-frame is a horizontal partition 12, having the opening 13 near its forward edge and at its central portion. I have provided an inclined bottom 14 for the interior of the frame, which extends from the sides and back to a point adjacent to the opening 13. In the front of the frame I have provided a glass plate, so that the interior of the cabinet can be easily viewed from its exterior. At some distance beneath the horizontal partition 12 is a second horizontal partition 15, having an opening 16 near one end thereof, said opening being out of alinement with the opening 13 in the horizontal partition 12. A chute 17 is fixed to the under surface of the partition 15, and beneath the opening 16 they discharge forwardly and downwardly. Within the space between the horizontal partitions 12 and 15 I have mounted a measuring-cabinet 18, open at its top and bottom and of a length capable of extending from one edge of the opening 13 to the opposite side of the cabinet from said edge. In height the measuring-chamber is designed to fit accurately between the partitions 12 and 15, and it is slightly wider than the length of the opening 13 of the horizontal partition 12. This measuring-chamber is held against forward movement by means of the containing-strips 19, which are attached to the front of the cabinet and beneath the glass plate, said strips being slightly wider than the thickness of the horizontal partitions 12 and 15. These containing-strips are held in place by being attached to these horizontal partitions. A handle 20 is firmly attached to the front of the measuring-cabinet 18, by which the measuring-chamber may be manually moved longitudinally beneath the hopper, which is formed by means of the inclined bottom and its projections.

Through the front side of the measuring-chamber 18, and preferably at the right hand of the handle 20, is a longitudinal slot 21, designed to receive the handle which operates the partition in the measuring-chamber, which will be more fully set forth hereinafter. Extending around the longitudinal slot 21 is the indicating-plate 22, having a longitudinal slot therein corresponding to the longitudinal slot 21. This indicating-plate has a series of notches for purposes hereinafter made clear, and any number of indicating-marks can be placed on said plate. Within the measuring-chamber 18 is an adjustable partition 23, the vertical dimensions of which are of any desirable height. This partition is of such width that it can slide freely between the sides of the measuring-chamber 18. Through the slot 21 in the side of the measuring-chamber 18 and through the side of the partition nearest said slot and extending transversely of the partition 23 until its squared end 24 enters the opposite side of the partition 23 is the indicator-rod 25, said indicator-rod having a coil-spring 31, attached at its inner end to the rod 25 and at its outer end to the sleeve 26, through which the rod 25 extends as it passes through the front side of the partition 23. This spring is thus arranged to hold the rod 25 in position. To the inner side 27 of the partition 23 and near the point where the rod 25 enters said side 27 I have mounted a metal plate 28$^a$, having a squared notch therein to prevent the rod 25 from rotating. On the rod 25 and between the knob 28, which is at its outer end, and the indicating-plate 22 I have mounted the indicating-finger 29, said finger extending through the rod 25, so that it will readily engage the slots 30 in the indicating-plate 22, and said finger will be held firmly in engagement with the indicating-plate 22 by means of the coil-spring 31 above referred to.

When it is desired to move the partition from one position in the measuring-chamber to another by means of the indicating-rod, this can be readily done by pulling the knob 28 outwardly, which will draw the rod 25 in the same direction and cause the finger 29 to be drawn out of engagement with the slots 30 on the indicating-plate 22, and as soon as the partition has been moved to its desired position the knob can be released, and it can readily adjust itself against the indicating-plate 22 and, if desired, in one of the slots 30. As indicated above, I have provided slight extensions to the inclined bottom and numbered them 32 for the sake of convenience. Said extensions project from the inclined bottom and of sufficient length to extend into the opening 13 of the horizontal bottom, and the extensions are also a slight distance from the sides of this opening 13.

Near the rear end of the partition 23 and to its top portion I have attached firmly the metal plate 33, said metal plate being at its rear end a slight distance above the top of the partition. This plate extends forwardly from its point of attachment to the front end of the partition and has its forward end 34 projecting downwardly at substantially right angles to the body portion, so that the forward end rests against the forward end of the partition 23. This plate 33 is made, preferably, of spring metal, and the front of its body portion is designed to rest against the top of the partition 23 when at its lower limit of movement. Pivotally attached between the sides of the measuring-cabinet and at its rear end is a thin metal plate 35. Said plate 35 is slightly longer than the length of the partition 23, and its forward end is designed to rest upon the upper surface of the plate 33. I have firmly attached to that portion of the bottom which is above the partition 23 when it is at its right-hand limit of movement the plate 36, which is preferably made of thin sheet metal, said plate being of substantially the same width as the width of the opening 13. The body portion of the plate 36 is made substantially flat and has at the end away from its point of attachment a projection 37, which is substantially at right angles to the body portion and extends downwardly therefrom between the edge of the opening 13 nearest the point of attachment of the plate 36 and the extension 32 of the hopper. This projection 37 has a forward projection 38, which is substantially at right angles to the portion 37 and substantially parallel with the body portion of the plate 36. This portion 38 is designed to rest on top of the metal plate 35, so that the substance which comes through the bottom of the hopper will be thrown inwardly by means of said metal plate and its projections, and the substance contained in the hopper will be prevented from escaping into any other portion of the measuring-cabinet than that which is beneath the hopper and in front of the partition 23. In the top of the partition 23 is the eccentric-rod 39, having a screw-head at its front end. This eccentric is so arranged that upon turning it in one direction the metal plate 33 will be raised upwardly, and in consequence of its being raised upwardly the plates 35 and 36 will be correspondingly raised at any desirable distance. An opening 40 is made through the front side of the measuring-chamber 18, so that when the partition is placed in a certain position access may be had to the screw-head on the eccentric 39 from the exterior of the measuring-chamber through this opening 40. It will thus be seen by simply using the screw-driver the plates 33, 35, and 36 may be raised or lowered at the desire of the operator. The raising and lowering of these plates, together with the raising of the plate to be described hereinafter, accomplishes the purpose of enlarging the space between the partition and the forward end of the measuring-chamber without moving the partition itself.

Attached to the opposite end of the bottom 12, from which the plate 36 is attached, is a metal plate 41, said plate being made of the same substance as the plate 36. The end of the plate 41 nearest the hopper is bent downwardly and substantially at right angles to the body portion of it, forming the projection 42 thereon, said projection having its end portion bent rearwardly and upwardly to form a rounded portion thereon. This projection is designed to rest against the outer portion of the hopper nearest said projection and the rear end of said projection is designed to enter the measuring-cabinet and fit snugly between its sides, so that when the measuring-chamber has been moved longitudinally of the portion between the partitions 12 and 15 the substance contained in the measuring-chamber will not be forced upwardly. This projection forms a scraper and evens off the material at the level of its lower end. It is obvious that when this plate, which is composed of spring metal, is attached in the way specified the space between the front end of the partition and the front end of the measuring-chamber and beneath the projection 42 of the metal plate 41 will be the space which will determine the amount of material to be delivered into the hopper 17 when the measuring-chamber is moved from right to left in the bottom 12. Immediately beneath the forward end of the body portion of the plate 41 I have provided an eccentric 39, having a screw-head on its forward end, so that by turning the eccentric in one direction the metal plate will be raised and turned in the opposite direction to lower it.

I have provided a protector for the lower portion of the hopper comprising the top portion 43 and the end portion 44. Said end portion is substantially at right angles to the top portion 43 and is attached to the back side of the hopper. This protector is thus adjusted over the opening in the hopper to prevent substance in the hopper from bearing too heavily upon the measuring-chamber, and a greater portion of the substance in the hopper will be borne by this protector. The flow of the substance, however, will not be prevented, owing to the protector being approximately one-half the width of the opening of the hopper.

In practical use and assuming that the space above the hopper in the cabinet is filled with coffee by means of raising the lid 11 and that the measuring-chamber 18 is moved to its extreme limit of movement it will be clearly seen that the metal plate 35 and the projections of the metal plates 36 and 41 form an absolute cut-off for the bottom of the hopper. The operator then adjusts the partition 23 within the measuring-chamber by grasping the knob 28 and pulling it toward him a slight distance by moving the knob 28. While in this extended position the partition, it will be seen, can be readily adjusted for the required amount. He then grasps the handle 20, by means of which he moves the measuring-chamber to the right and beneath the opening 13 at the bottom of the hopper, as shown in Fig. 2 of the drawings. The coffee then falls into the measuring-chamber and rapidly fills the space between the front end of the partition and the front end of the measuring-cabinet. As soon as this is filled he again grasps the handle 20 and moves the measuring-chamber into the position first stated, and the coffee in the chamber when the plate is beneath the opening 13 will be on a level with said plate and the lower end of the projection 42 of the metal plate 41, and an absolute shut-off of the coffee is had by means of the metal plates 35, 36, and 41, together with the projections of the plates 36 and 41.

With the above statement it is assumed that the indicating-plate is so arranged as to compute the value of coffee, which is of sufficient weight and size to fill the space between the front end of the partition and the front end of the measuring-chamber when the partition is adjusted and held at a desired position against the face of the indicating-plate. It is presumed that the amount in the space between the front portion of the partition 23 and the front portion of the measuring-chamber 18 will correspond to the marks designated on the indicating-plate 22 by the indicating-finger 29 when the plates 41, 36, 35, and 33 are at their lower limit of movement. Assuming that a lighter grade of coffee is to be used in the hopper than was used at first and it is desirable to change the amount of space beneath the cut-off and between the partition and the front portion of the measuring-chamber, I accomplish this result by raising the plates 33, 35, and 36 by simply turning the eccentric 39, which causes the outer ends of these plates to be raised. I then raise the outer end of the plate 41 by means of the eccentric 45, above referred to. It will be clearly seen that the cut-off will be higher up by means of raising the outer ends of these metal plates. The level of the coffee will thus always be determined by the metal-plate cut-offs, and these cut-offs will also serve to prevent the substance contained in the device from getting into the working parts of it.

Having thus described my invention, what I claim, and desire to secure by Letters Patent of the United States therefor, is—

1. In a device of the class described, the combination of a hopper, a measuring-chamber mounted beneath the hopper, spring-metal plates mounted above said measuring-chamber, means for adjusting said plates for determining the capacity of the measuring-chamber as the measuring-chamber is moved horizontally beneath the hopper, for the purposes stated.

2. In a device of the class described, a hopper, a measuring-chamber mounted beneath said hopper, an adjustable partition in said measuring-chamber, metal plates attached near the hopper, a metal plate attached to the measuring-chamber, and a metal plate attached to the partition, means for raising and lowering said metal plates relative to the measuring-chamber, for the purposes stated.

3. In a measuring-cabinet, the combination with a hopper, of a measuring-chamber slidingly mounted beneath said hopper, spring-metal plates attached in the measuring-chamber having their free ends near the bottom of the hopper, and means for adjusting the free ends of said plates vertically, for the purposes stated.

4. In a measuring-cabinet having two horizontal partitions therein, openings in said partitions out of alinement with each other, a hopper extending into the opening in the upper partition, metal plates attached to the upper surface of the upper partition and having their forward ends substantially at right angles to the body portion, said front ends extending through said opening, a measuring-chamber slidingly mounted between said horizontal partitions, pivotally-mounted metal plates in said measuring-chamber designed to allow the metal plates which are attached to the upper surface of the upper partition to rest against them, and means for raising and lowering the free ends of said metal plates, for the purposes stated.

5. In a measuring-cabinet having two horizontal partitions therein, openings in said partitions out of alinement with each other, a hopper extending into the opening in the upper partition, metal plates attached to the upper surface of the upper partition and having their forward ends substantially at right angles to the body portion, said front ends extending through said opening, a measuring-chamber mounted between said horizontal partitions, a metal plate pivotally attached to the measuring-chamber, a partition in said measuring-chamber upon which the metal plates and the measuring-cabinet rest, means for raising and lowering the ends of the plates nearest the hopper, substantially as and for the purposes stated.

6. In a device of the class described, the combination of a hopper, a horizontal partition below the hopper, having an opening therein to receive the lower end of the hopper, metal plates attached to the horizontal partition and extending between the outside of the hopper and the edges of said opening, eccentrics for raising and lowering the ends of said spring-metal plates to which the projections are attached.

7. In a device of the class described, the combination of a hopper, a horizontal partition below the hopper having an opening therein to receive the lower end of the hopper, metal plates attached to the horizontal partition and extending between the outside of the hopper and the edges of said opening, means for raising and lowering the ends of said metal plates nearest the hopper, for the purposes stated.

8. In a device of the class described, the combination with a horizontal partition having an opening in its central forward portion, spring-metal plates attached to the upper surface of the horizontal partition, projections on said metal plates extending substantially at right angles to the body portion of the metal plates and through said opening, means for raising and lowering the ends of said metal plates nearest the hopper, a measuring-chamber mounted beneath said partition, for the purposes stated.

9. In a device of the class described, the combination of a hopper, a horizontal partition below the hopper having an opening therein designed to receive the lower end of the hopper, metal plates attached to the horizontal partition and extending between the outside of the hopper and the edges of said opening, a second partition mounted beneath said horizontal partition and parallel with it, a measuring-chamber slidingly mounted between said partitions, an adjustable partition in the measuring-chamber, a metal plate attached to said adjustable partition, means for raising and lowering one end of said metal plate which is attached to the adjustable partition, for the purposes stated.

10. In a device of the class described, a measuring-chamber having side and end portions, a partition having end, top and side portions adjustably mounted within said measuring-chamber, the front side of said measuring-chamber having a longitudinal slot therein, a rod extending through said slot and an indicating-finger on said rod to rest against the outside of the measuring-chamber, means for holding the rod against rotatable movement, a spring mounted on said rod and on the interior of said partition to hold the finger firmly against the front surface of the measuring-chamber, for the purposes stated.

11. In a device of the class described, the combination of a measuring-chamber having a longitudinal slot in the front side thereof, an indicating-plate mounted around said slot, a rod in said partition and extending through said slot, an indicating-finger in said rod to rest against said indicating-plate, a coil-spring on the interior of said partition for holding the indicating-finger firmly against the indicating-plate, for the purposes stated.

12. In a device of the class described, the combination of a measuring-chamber having a longitudinal slot in the front side thereof, an indicating-plate mounted around said slot, a rod in said partition and extending through said slot, an indicating-finger in said rod to rest against said indicating-plate, a coil-spring on the interior of said partition for holding the indicating-finger firmly against the indicating-plate, a metal plate having a squared notch therein attached to the partition to receive the squared end of said rod, a knob attached to said measuring-chamber, for the purposes stated.

13. In a device of the class described, the combination of a horizontal partition having an opening therein, a hopper extending into said opening, metal plates attached to the upper surface of the horizontal partition having projections at the end away from the point of attachment, said projections extending substantially at right angles to the body portion of the metal plates and into said opening and outside of said hopper, means for raising and lowering the ends of the metal plate nearest the hopper, for the purposes stated.

14. In a device of the class described, the combination of a horizontal partition having an opening therein, a hopper extending into said opening, metal plates attached to the upper surface of the horizontal partition having projections at the end away from the point of attachment, said projections extending substantially at right angles to the body portion of the metal plates and into said opening and outside of said hopper, a measuring-chamber having metal plates therein in engagement with one of said metal plates, means for raising and lowering the ends of said metal plates nearest the hopper, a lower partition for supporting the measuring-chamber having an opening in it out of alinement with the opening in the said horizontal partition, for the purposes stated.

ERNEST J. AUSTIN.

Witnesses:
F. L. MAYTAG,
HOWARD SNYDER.